United States Patent
Yu

(10) Patent No.: US 7,870,866 B2
(45) Date of Patent: Jan. 18, 2011

(54) VALVE STEM ASSEMBLY FOR CLAMPING A TIRE PRESSURE DETECTOR

(75) Inventor: Hung-Chih Yu, Taichung (TW)

(73) Assignee: Orange Electronic Co., Ltd., Taichung Hsien (TW)

( * ) Notice: Subject to any disclaimer, the term of this patent is extended or adjusted under 35 U.S.C. 154(b) by 505 days.

(21) Appl. No.: 12/045,083

(22) Filed: Mar. 10, 2008

(65) Prior Publication Data

US 2009/0223570 A1   Sep. 10, 2009

(51) Int. Cl.
*B60C 23/02*   (2006.01)
*B60C 23/04*   (2006.01)

(52) U.S. Cl. ........................ 137/227; 73/146; 73/146.8

(58) Field of Classification Search ................ 137/223, 137/227, 269, 270; 73/146, 146.2, 146.3, 73/146.4, 146.5, 146.8; 340/442
See application file for complete search history.

(56) References Cited

U.S. PATENT DOCUMENTS

| | | | | |
|---|---|---|---|---|
| 5,844,131 A * | 12/1998 | Gabelmann et al. | ........ | 73/146.8 |
| 5,956,820 A * | 9/1999 | Albinski | ..................... | 340/442 |
| 6,055,855 A * | 5/2000 | Straub | ........................ | 73/146.8 |
| 6,557,406 B2 * | 5/2003 | Gabelmann | ................ | 73/146.5 |
| 6,591,672 B2 * | 7/2003 | Chuang et al. | ............. | 73/146.8 |
| 6,739,187 B2 * | 5/2004 | Luce | .......................... | 73/146.8 |
| 6,805,001 B2 * | 10/2004 | Luce | .......................... | 73/146.8 |
| 6,862,929 B2 * | 3/2005 | Luce | .......................... | 73/146.8 |
| 6,895,810 B2 * | 5/2005 | Saheki et al. | .............. | 73/146.8 |
| 6,945,104 B2 * | 9/2005 | Uleski | ........................ | 73/146.8 |
| 6,952,955 B1 * | 10/2005 | Uleski | ......................... | 73/146 |
| 6,952,957 B2 * | 10/2005 | Kayukawa | ................. | 73/146.8 |
| 6,959,597 B2 * | 11/2005 | Ito et al. | .................... | 73/146.8 |
| 7,017,403 B2 * | 3/2006 | Normann et al. | .......... | 73/146.2 |
| 7,021,133 B1 * | 4/2006 | Hsu | .......................... | 73/146.8 |
| 7,059,178 B2 * | 6/2006 | Fischer et al. | ................. | 73/147 |
| 7,145,443 B2 * | 12/2006 | Ito et al. | .................... | 340/442 |
| 7,395,702 B2 * | 7/2008 | Qiu et al. | .................... | 73/146.8 |
| 7,536,904 B1 * | 5/2009 | Yu | .............................. | 73/146.8 |
| 7,775,095 B2 * | 8/2010 | Yu | ............................... | 73/146 |
| 2003/0154779 A1 * | 8/2003 | Polenghi | ..................... | 73/146.8 |

* cited by examiner

*Primary Examiner*—John Rivell
(74) *Attorney, Agent, or Firm*—Alan Kamrath; Kamrath & Associates PA

(57) ABSTRACT

A valve stem assembly for clamping tire pressure detector has a valve stem and a fastener. The valve stem has an outer section and an inner section. The inner section has a distal end, an outlet hole, a sidewall and a side fixing hole. The distal end has a domical surface. The outlet hole is centrally formed through the domical surface. The side fixing hole is formed in the inner section, is oblique to the outlet hole and communicates with the outlet hole inside the inner section. The fastener corresponds to the outlet hole and the side fixing hole and is selectively and detachably and selectively screwed into the outlet hole or the side fixing hole to hold a tire pressure detector on the valve stem assembly.

8 Claims, 4 Drawing Sheets

VALVE STEM ASSEMBLY FOR CLAMPING A TIRE PRESSURE DETECTOR

BACKGROUND OF THE INVENTION

1. Field of Invention

The present invention relates to a valve stem, and more particularly to a valve stem that is easy and adjustable at angle to clamp a tire pressure detector thereon.

2. Description of the Related Art

With reference to FIG. 4, a conventional valve stem (70) designed for connecting with a tire pressure detector (90) has a connecting end (71). The connecting end (71) protrudes form a rim (81) of a tire (80) after the valve stem (70) is mounted on the rim (81) and has an arced surface (711) and a mounting hole (712). The arced surface (711) is formed on the connecting end (71). The mounting hole (712) is coaxially formed in the connecting end (71) through the arced surface (711). The tire pressure detector (90) corresponds to and is detachably and securely mounted on the arced surface (711) with a screw. To prevent damages, the tire pressure detector (90) is adjusted to a position where is close to the rim (81) so that the tire (80) can be kept from pressing against the tire pressure detector (90). However, adjustability of the tire pressure detector (90) on the arced surface (711) is limited since the mounting hole (712) is centrally formed in the arced surface (711). The tire pressure detector (90) may protrude oat an annular edge (811) of the rim (81) after being mounted on the connecting end (71). Hence, the tire pressure detector (90) may be impacted by the tire (80), especially in a flat tire condition.

The present invention provides a valve stem assembly for clamping a tire pressure detector to obviate or mitigate the shortcomings of the conventional valve stem.

SUMMARY OF THE INVENTION

The primary objective of the present invention is to provide a valve stem assembly for clamping the tire pressure detector to improve mounting attitude adjustability of a tire pressure detector on the valve stem.

The valve stem assembly for clamping tire pressure detector has a valve stem and a fastener. The valve stem has an outer section and an inner section. The inner section has a distal end, an outlet hole, a sidewall and a side fixing hole. The distal end has a domical surface. The outlet hole is centrally formed through the domical surface. The side fixing hole is formed on the inner section, is oblique to the outlet hole and communicates with the outlet hole inside the inner section. The fastener corresponds to the outlet hole and the side fixing hole and is selectively and detachably and selectively screwed into the outlet hole or the side fixing hole to hold a tire pressure detector on the valve stem assembly.

Other objectives, advantages and novel features of the invention will become more apparent from the following detailed description when taken in conjunction with the accompanying drawings.

DETAILED DESCRIPTION OF THE INVENTION

Figure 1:
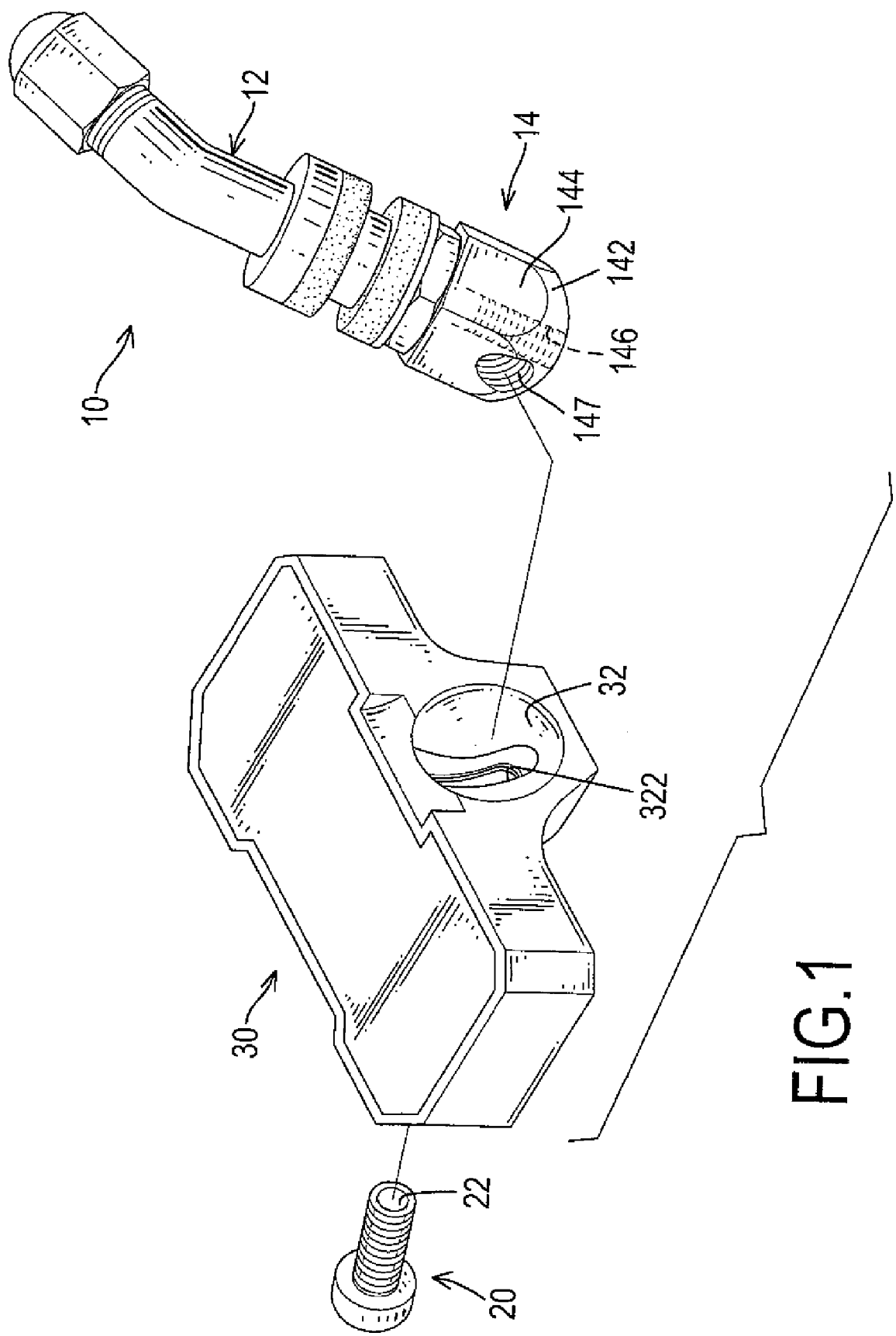
FIG. 1 is an exploded perspective view of a tire pressure detector with a valve stem assembly for clamping the tire pressure detector in accordance with the present invention.

With reference to FIG. 1, a valve stem assembly for clamping a tire pressure detector in accordance with the present invention comprises a valve stem (10) and a fastener (20).

The valve stem (10) is tubular and has an outer section (12) and an inner section (14).

The inner section (14) is integrally and coaxially formed on the outer section (12) and has a distal end, an outlet hole (146), a sidewall, a side fixing hole (147) and may have at least one clamping surface (144).

The distal end has a domical surface (142).

The outlet hole (146) is centrally formed through the domical surface (142), is longitudinally formed through the inner section (14) and has a threaded inner surface.

The side fixing hole (147) is formed in the domical surface (142) or the sidewall of the inner section (146), is oblique to the outlet hole (146), communicates with the outlet hole (146) inside the inner section (14) and has a threaded inner surface.

The at least one clamping surface (144) is tangentially formed on the sidewall, is flat and is capable to be clamped by tools such as clamps or spanners.

The fastener (20) corresponds to the outlet hole (146) and the side fixing hole (147), is detachably and selectively screwed with the threaded inner surface of one of the outlet hole (146) and the side fixing hole (147) and may have an air passage (22). The air passage (22) is coaxially formed through the fastener (20).

Figure 2:
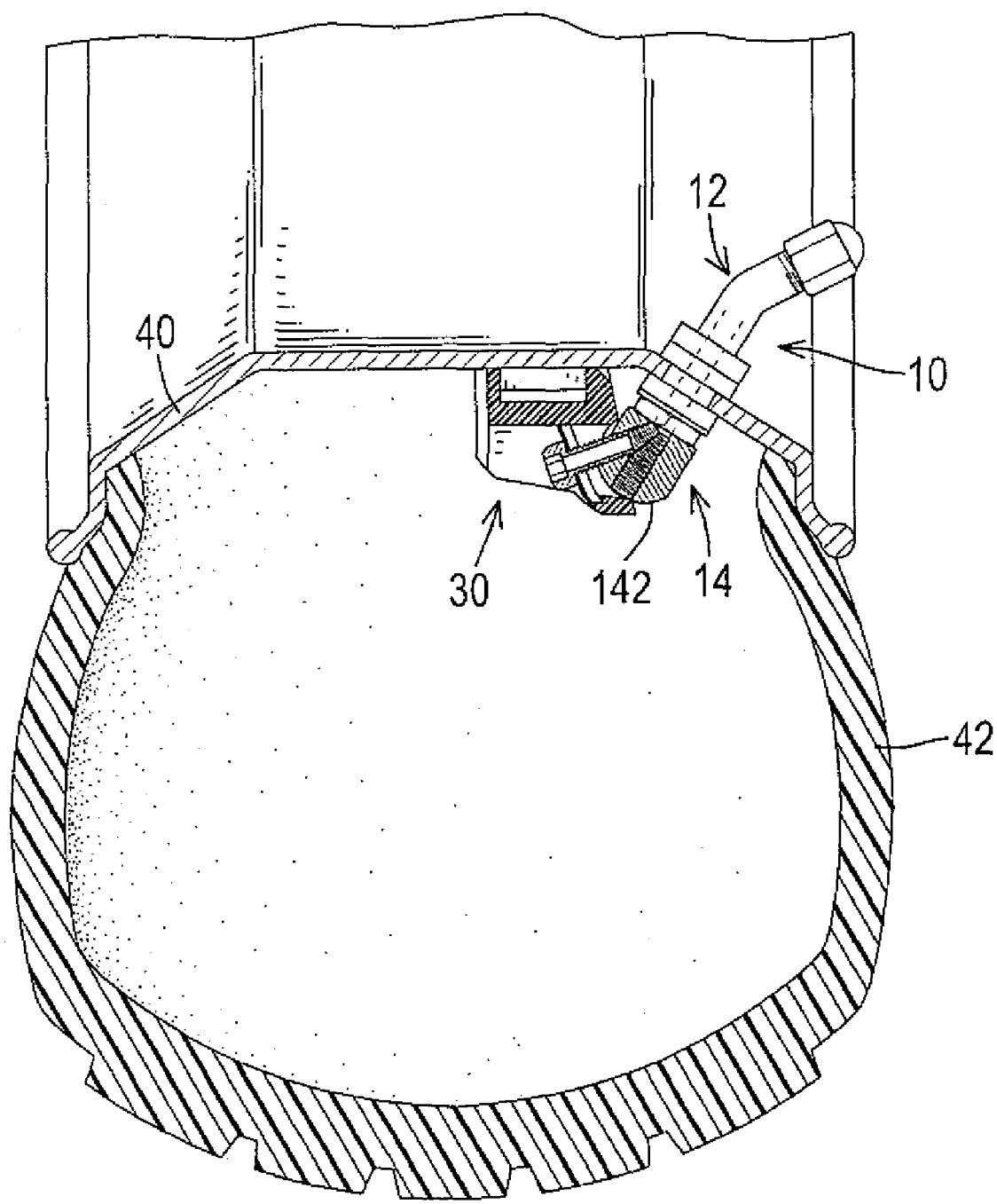
FIG. 2 is an operational side view in partial section of the valve stem assembly in FIG. 1, showing the valve stem assembly being mounted through a rim of a tire and holding a tire pressure detector.
Figure 3:
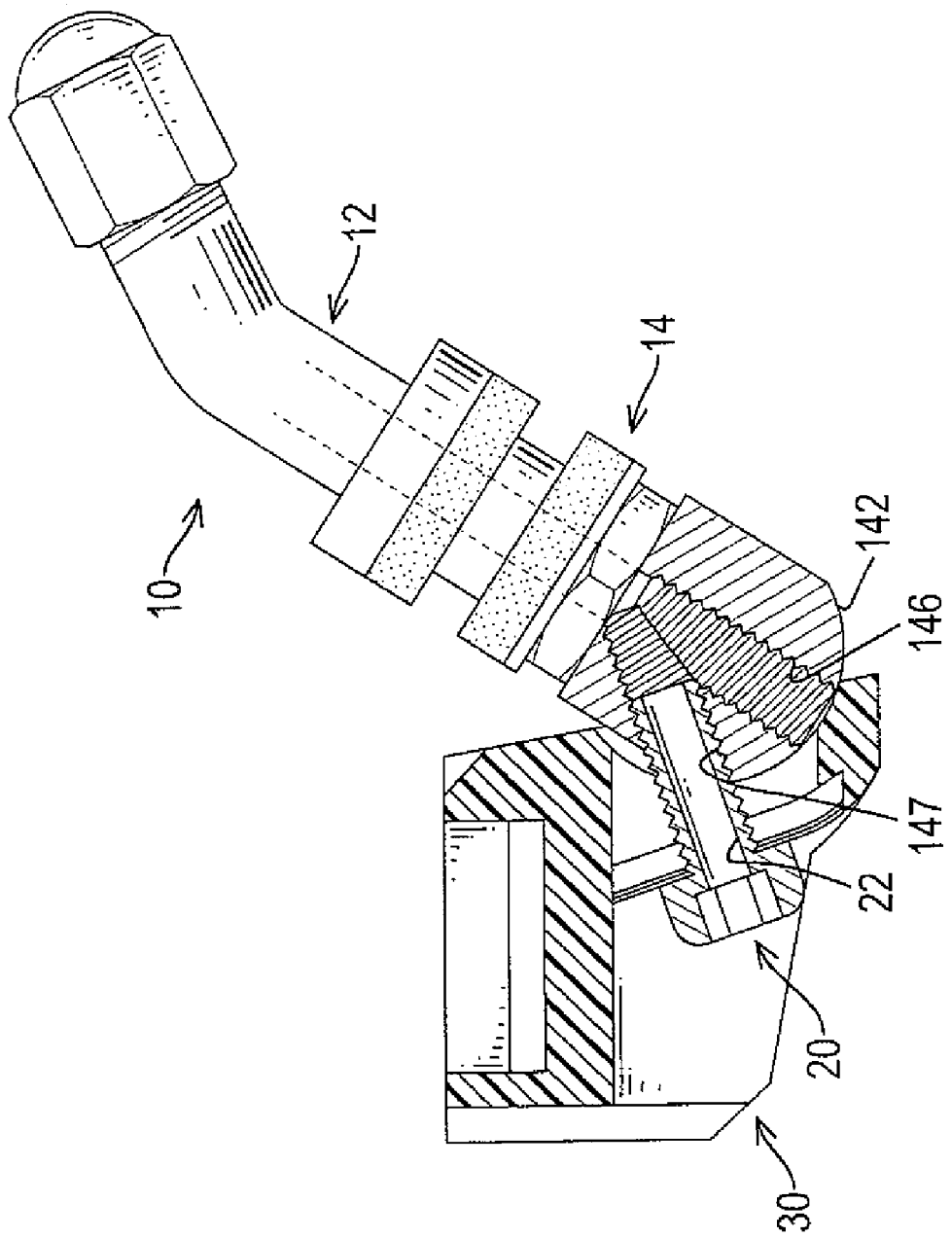
FIG. 3 is an enlarged side view in partial section of the valve stem assembly with the tire pressure detector in FIG. 2.
Figure 4:
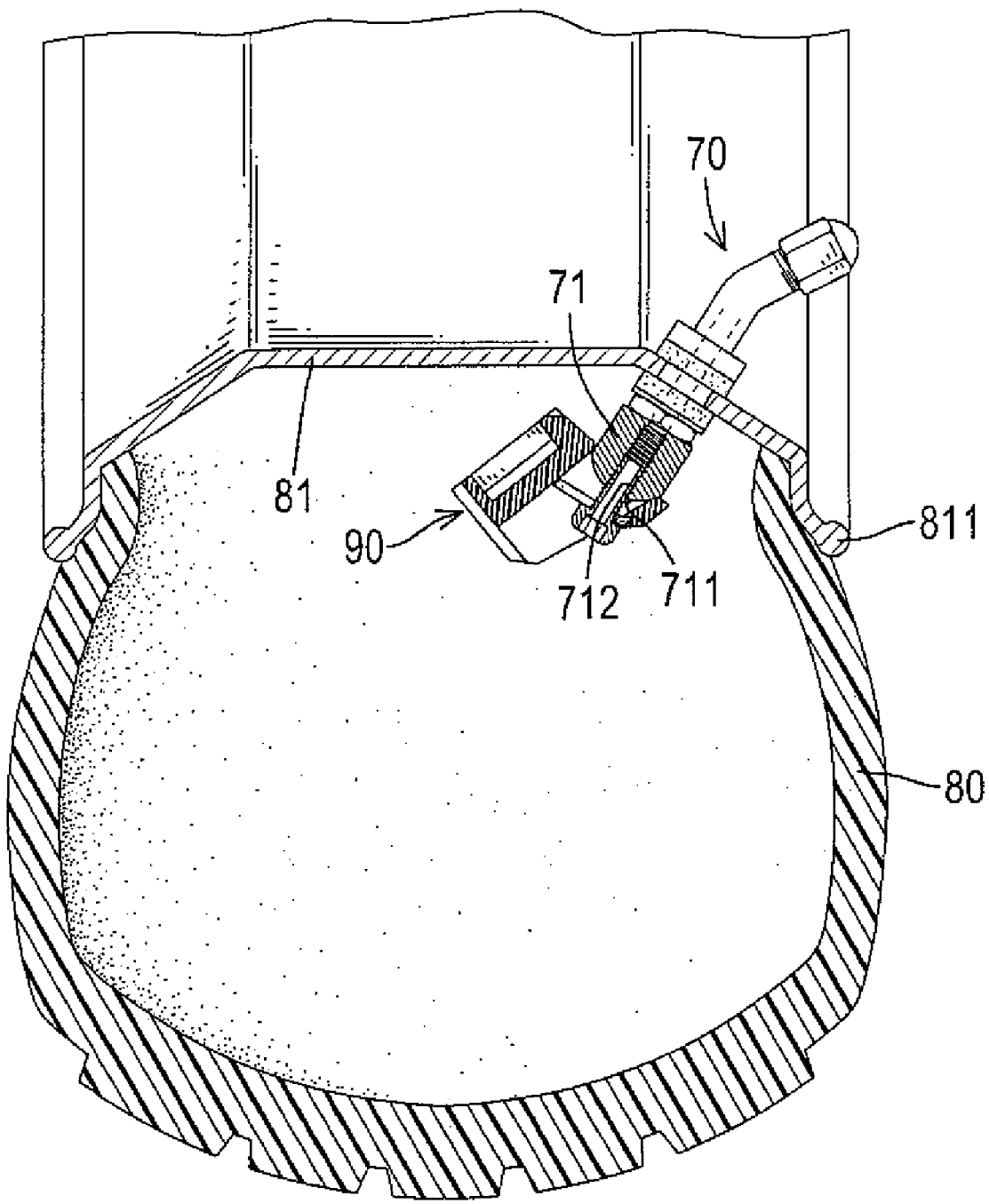
FIG. 4 is a side view in partial section of a conventional valve stem for clamping a tire pressure detector on a tire in accordance with the prior art.

With further reference to FIGS. 2 and 3, when assembly, the valve stem (10) is securely mounted on a rim (40) of a tire (42), then a tire pressure detector (30) is securely mounted on the inner section (14). Wherein, the tire pressure detector (30) may have an arced surface (32) and a slot (322). The arced surface (32) corresponds to and is detachably mounted on the domical surface (142) so that the tire pressure detector (30) may be adjusted relative to the inner section (14) to be close to the rim (40). The slot (322) is formed on the arced surface (32) through the tire pressure detector (30) and corresponds to and holds the fastener (20). The fastener (20) is mounted through the slot (322) and is screwed into the outlet hole (146) or the side fixing hole (147) to hold the tire pressure detector (30) securely on the inner section (14). Hence, tire pressure detectors (30) may be selectively mounted on the outlet hole (146) or the side fixing hole (147) in accordance with sizes of the tire pressure detectors (30). When the size of the tire pressure detector (30) is too large, the tire pressure detector (30) is no longer suitable mounted in the outlet hole (146) since it is risky to interference with the tire (42) under a flat tire condition. Hence, the large tire pressure detector (30) may be mounted on the side fixing hole (147) to be close to the rim (40) to prevent damages.

Furthermore, air flows from the outer section (12) is smooth since the outlet hole (146) and the side fixing hole (147) are communicated with each other, even one of them are blocked by the mounted tire pressure detector (30). Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A valve stem assembly comprising:
   a valve stem being tubular and having
      an outer section; and
      an inner section being integrally and coaxially formed on the outer section and having
         a distal end having a domical surface;
         an outlet hole being centrally formed through the domical surface, being longitudinally formed through the inner section and having a threaded inner surface;
         a sidewall; and
         a side fixing hole being formed in the inner section, being oblique to the outlet hole, communicating with the outlet hole inside the inner section and having a threaded inner surface; and
   a fastener corresponding to the outlet hole and the side fixing hole and being detachably and selectively screwed with the threaded inner surface of one of the outlet hole and the side fixing hole.

2. The valve stem assembly as claimed in claim 1, wherein the inner section further has at least one clamping surface being tangentially formed on the sidewall of the inner section and being flat.

3. The valve stem assembly as claimed in claim 1, wherein the fastener further has an air passage being coaxially formed through the fastener.

4. The valve stem assembly as claimed in claim 2, wherein the fastener further has an air passage being coaxially formed through the fastener.

5. The valve stem assembly as claimed in claim 1, wherein the side fixing hole is formed in the domical surface of the inner section.

6. The valve stem assembly as claimed in claim 4, wherein the side fixing hole is formed in the domical surface of the inner section.

7. The valve stem assembly as claimed in claim 1, wherein the side fixing hole is formed in the sidewall of the inner section.

8. The valve stem assembly as claimed in claim 4, wherein the side fixing hole is formed in the domical surface of the inner section.

\* \* \* \* \*